US006996049B2

(12) United States Patent
Kuroda

(10) Patent No.: US 6,996,049 B2
(45) Date of Patent: Feb. 7, 2006

(54) OPTICAL DISK RECORDING APPARATUS, OPTICAL DISK RECORDING METHOD, OPTICAL DISK REPRODUCING APPARATUS, AND OPTICAL DISK CAPABLE OF INTERLAYER CROSSTALK REDUCTION

(75) Inventor: Kazuto Kuroda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 526 days.

(21) Appl. No.: 10/107,295

(22) Filed: Mar. 28, 2002

(65) Prior Publication Data

US 2003/0103431 A1    Jun. 5, 2003

(30) Foreign Application Priority Data

Dec. 3, 2001    (JP)    ............................. 2001-368853

(51) Int. Cl.
*G11B 7/00*    (2006.01)

(52) U.S. Cl. ................................. 369/59.25; 369/53.24
(58) Field of Classification Search ............ 369/59.25, 369/53.24, 94, 275.3
See application file for complete search history.

(56) References Cited

U.S. PATENT DOCUMENTS

| 4,734,901 | A | * | 3/1988 | Murakami | ............... | 369/59.25 |
| 5,210,734 | A | * | 5/1993 | Sakurai | ................... | 369/47.16 |
| 5,729,525 | A | * | 3/1998 | Ishida et al. | ............ | 369/275.3 |
| 5,862,112 | A | * | 1/1999 | Nagai et al. | ............ | 369/44.36 |
| 5,862,123 | A | * | 1/1999 | Horie et al. | ............. | 369/275.4 |
| 5,978,336 | A | * | 11/1999 | Mine et al. | ............... | 369/47.14 |
| 2002/0051414 | A1 | * | 5/2002 | Kuribayashi | ............. | 369/53.24 |
| 2002/0054550 | A1 | * | 5/2002 | Tomita | ...................... | 369/47.5 |
| 2002/0080705 | A1 | * | 6/2002 | Van Woudenberg | ..... | 369/59.25 |

FOREIGN PATENT DOCUMENTS

| JP | 3-157816 | 7/1991 |
| JP | 09-180248 | 7/1997 |
| JP | 09-180257 | 7/1997 |
| JP | 10-3694 | 1/1998 |
| JP | 10-149546 | 6/1998 |
| JP | 2000-36130 | 2/2000 |
| JP | 2001-101709 | 4/2001 |

OTHER PUBLICATIONS

Japanese Patent Office Action dated Feb. 10, 2004.
Japanese Office Action, dated Jun. 1, 2004 for Patent Application No. 2001-368853.

* cited by examiner

*Primary Examiner*—Brian E. Miller
*Assistant Examiner*—Peter Vincent Agustin
(74) *Attorney, Agent, or Firm*—Pillsbury Winthrop Shaw Pittman, LLP

(57) ABSTRACT

An optical disk recording apparatus is configured to record information on a multilayer optical disk having a general information recording area for recording general information and a management information recording area for recording management information which manages general information recorded on this general information recording area. In this optical disk recording apparatus, meaningless information is recorded on an unrecorded area in the management information recording area of the optical disk.

6 Claims, 5 Drawing Sheets

OPTICAL DISK RECORDING APPARATUS, OPTICAL DISK RECORDING METHOD, OPTICAL DISK REPRODUCING APPARATUS, AND OPTICAL DISK CAPABLE OF INTERLAYER CROSSTALK REDUCTION

CROSS-REFERENCE TO RELATED APPLICATIONS

This application is based upon and claims the benefit of priority from the prior Japanese Patent Application No. 2001-368853, filed Dec. 3, 2001, the entire contents of which are incorporated herein by reference.

BACKGROUND OF THE INVENTION

1. Field of the Invention

The present invention relates to an optical disk recording apparatus and an optical disk recording method for recording information on a multilayer rewritable or write-once read-many optical disk. Further, the present invention relates to an optical disk reproducing apparatus for reproducing information from a multilayer rewritable or write-once read-many optical disk. Moreover, the present invention relates to improvement of a multilayer rewritable or write-once read-many optical disk.

2. Description of the Related Art

In recent years, it is widely known that a multilayer-type optical disk is developed for increasing the capacity of optical disks as information recording media. The multilayer optical disk makes it possible to selectively record or reproduce information on a plurality of layers by irradiating a recording or reproduction laser beam from either side of the disk.

Inside the optical disk, the laser beam passes through layers sequentially from a layer nearer to the irradiating side to a layer farther therefrom, reaches a target layer, and is converged thereon. In this manner, it is possible to write or read information from an intended layer of the optical disk.

During transmission through layers of the optical disk, however, the laser beam is deteriorated due to undesired reflection on respective layers. At this time, the light reflectance depends on whether information is recorded (recorded state) or not (unrecorded state) on a layer which the laser beam passes through.

Namely, it is impossible to record or reproduce information with the same characteristic depending on whether the laser beam passes through an unrecorded layer or a recorded layer to reach a farther layer for recording or reproducing information therefrom.

The same layer may contain unrecorded and recorded areas mixedly. When the laser beam passes through a boundary between the unrecorded and recorded areas, it is subject to an interlayer crosstalk due to a difference between light reflectances of both areas. This prevents desirable recording or reproduction on a layer farther therefrom.

Especially, some optical disks record the information for managing recorded information on a predetermined management information recording area. Such optical disks cannot maintain stable reliability of the management information to be recorded or reproduced depending on whether the management information recording area is preceded by an unrecorded or recorded layer.

BRIEF SUMMARY OF THE INVENTION

The present invention has been made in consideration of the foregoing. It is therefore an object of the present invention to provide an optical disk recording apparatus, an optical disk recording method, an optical disk reproducing apparatus, and an optical disk capable of decreasing an effect of interlayer crosstalk and recording and reproducing information with high reliability.

According to one aspect of the present invention, there is provided an optical disk recording apparatus configured to record information on an optical disk having a general information recording area for recording general information and a management information recording area for recording management information which manages general information recorded on this general information recording area, the apparatus comprising: a meaningless information recording section which writes meaningless information on an unrecorded area in a management information recording area of the optical disk.

According to one aspect of the present invention, there is provided an optical disk recording method of recording information on an optical disk having a general information recording area for recording general information and a management information recording area for recording management information which manages general information recorded on this general information recording area, the method comprising: recording the management information on a management information recording area of the optical disk, then writing meaningless information on a remaining unrecorded area in the management information recording area.

According to one aspect of the present invention, there is provided an optical disk reproducing apparatus configured to reproduce an optical disk having a management information recording area which records management information for managing general information recorded in a general information recording area and records meaningless information on a remaining unrecorded area, the apparatus comprising: a control section which assumes meaningless information read from the optical disk to be meaningless.

According to one aspect of the present invention, there is provided an optical disk comprising: a management information recording area which records management information for managing general information recorded in a general information recording area and records meaningless information on a remaining unrecorded area.

According to the above-mentioned configurations and methods, meaningless information is recorded on an unrecorded area in the management information recording area of an optical disk. This prevents the management information recording area from containing recorded and unrecorded areas concurrently. It is possible to decrease an effect of interlayer crosstalk and record and reproduce information with high reliability.

DETAILED DESCRIPTION OF THE INVENTION

An embodiment of the present invention will be described in further detail with reference to the accompanying drawings.

Figure 1:
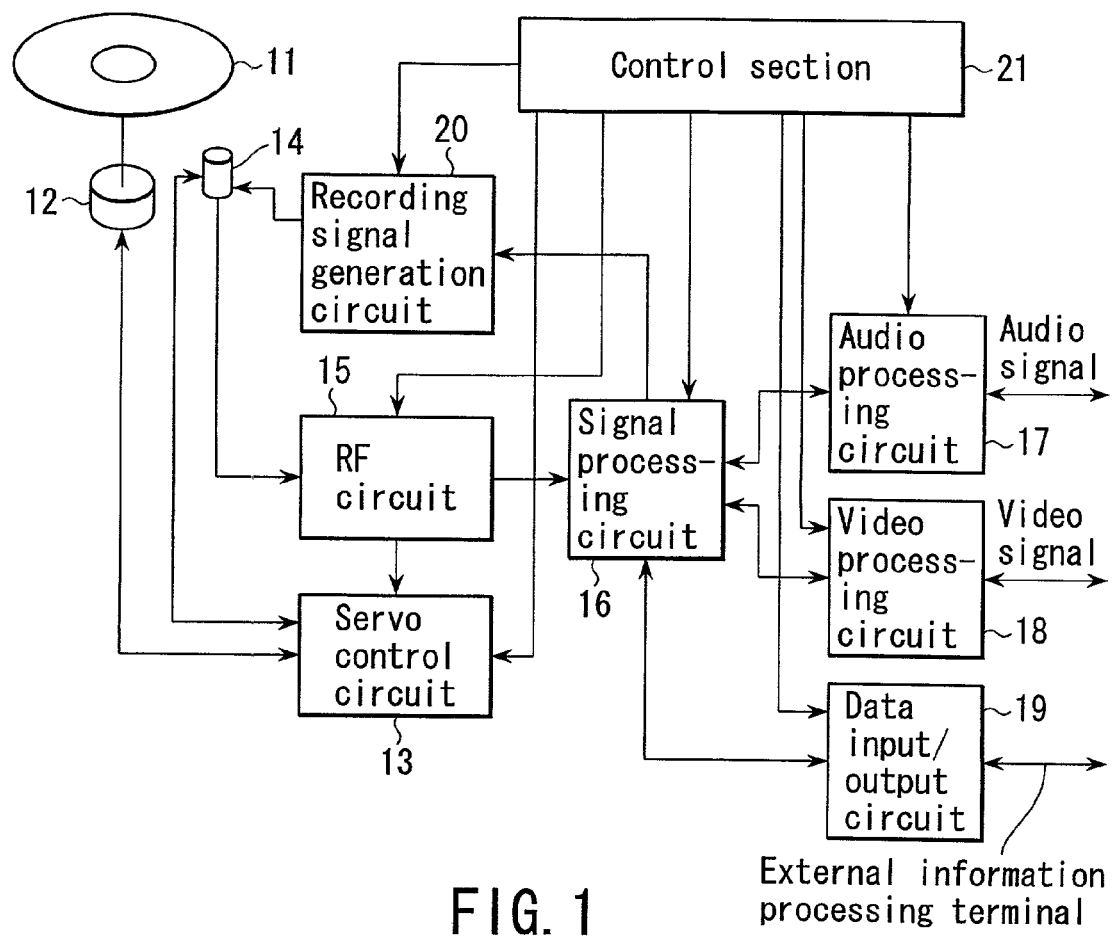
FIG. 1 is a block diagram showing an embodiment of the present invention and outlining an optical disk recording and/or reproducing apparatus.

FIG. 1 outlines an optical disk recording and/or reproducing apparatus described in the embodiment.

The optical disk recording and/or reproducing apparatus mainly has two functions. One is to selectively record, rewrite, and delete information on each layer of a rewritable multilayer optical disk 11. The other is to selectively reproduce information from each layer of optical disk 11.

A spindle motor 12 rotatively drives the optical disk 11. A servo control circuit 13 controls a revolution speed of the spindle motor 12.

An optical head 14 records or reproduces information from the optical disk 11. The servo control circuit 13 provides tracking servo and focus servo to an objective lens of the optical head 14.

During reproduction from the optical disk 11, a reproduction signal obtained by the optical head 14 is supplied to an RF (Radio Frequency) circuit 15. The RF circuit 15 generates a signal needed for servo from the RF signal and outputs the generated signal to the servo control circuit 13. The RF circuit 15 also outputs the RF signal to a signal processing circuit 16.

The signal processing circuit 16 demodulates or decodes the input RF signal to generate AV (Audio Video) and other information.

Audio and video data are supplied to an audio processing circuit 17 and a video processing circuit 18, respectively, and are output as an audio signal and a video signal. The other information is supplied to external information processing terminals via a data input/output circuit 19.

During a recording operation on the optical disk 11, the signal processing circuit 16 is supplied with signals input to the audio processing circuit 17, the video processing circuit 18, and the data input/output circuit 19. The signal processing circuit 16 modulates or encodes respective signals.

A recording signal generation circuit 20 converts a signal output from the signal processing circuit 16 to a format suited for recording on the optical disk 11. The converted signal is recorded on the optical disk 11 via the optical head 14.

A control section 21 including a microcomputer, etc. provides the aforementioned servo operation and a sequence of recording and reproduction operations by overall controlling the servo control circuit 13, the RF circuit 15, the signal processing circuit 16, the audio processing circuit 17, the video processing circuit 18, the data input/output circuit 19, the recording signal generation circuit 20, etc.

Figure 2:
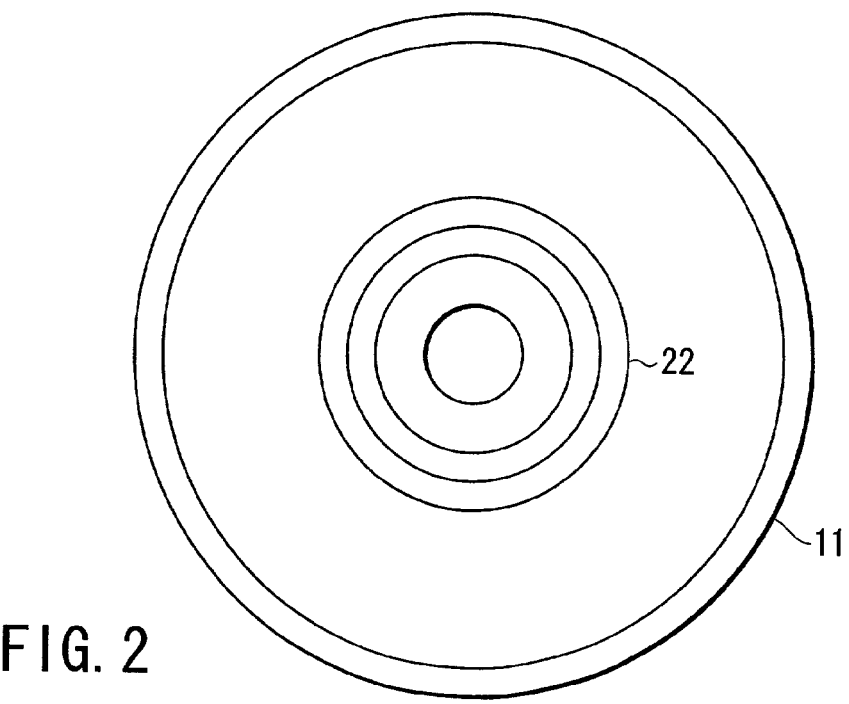
FIG. 2 is a plan view showing a detailed structure of an optical disk according to the embodiment.

FIG. 2 details the optical disk 11. The optical disk 11 has a two-layer structure as will be described later in greater detail. A fine wobbled pre-groove (continuous groove) is pre-recorded spirally or concentrically on each layer of the optical disk 11. This pre-groove constitutes a track 22.

To record information on the optical disk 11, the optical head 14 forms a recording mark in the pre-groove of any of layers.

Figure 3A:
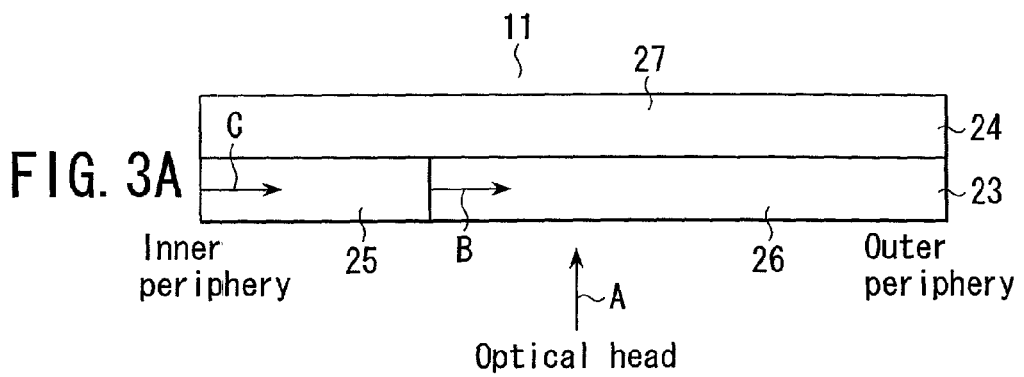
FIGS. 3A and 3B each illustrate recording areas on an optical disk according to the embodiment and a recording method for each layer.
Figure 3B:
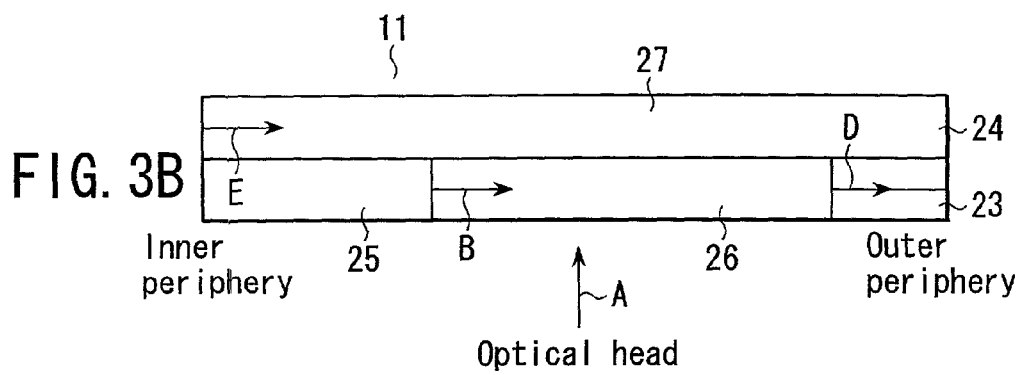

FIGS. 3A and 3B illustrate a recording method on each layer of the optical disk 11. A laser beam is irradiated from the optical head 14 and is incident on the optical disk 11 in the direction indicated by an arrow A in FIG. 3A. Of layers in the optical disk 11, a layer nearer to the laser beam's incident direction is hereinafter referred to as a first layer 23. A layer farther therefrom is hereinafter referred to as a second layer 24.

The first layer 23 is provided with a management information recording area 25 with a specified size from the innermost periphery to an outer periphery. Outside the management information recording area 25 on the first layer 23, there is provided a general information recording area 26 which records general information such as general files, AV files, etc.

The second layer 24 has a general information recording area 27 on its entire surface. The area 27 is provided for recording general information including data files, AV files and the like. The general information can be recorded in and reproduced from the recording area 27, by applying a laser beam to the second layer 24 through the first layer 23.

The general information is recorded on the optical disk 11 as indicated by an arrow B in FIG. 3A. Namely, the information recording starts from the end of the management information recording area 25 in the first layer 23, i.e., from the innermost periphery of the general information recording area toward an outer periphery.

When the general information has been recorded on the general information recording area 26, the management information is recorded on the management information recording area 25 from its innermost periphery toward an outer periphery as indicated by an arrow C in FIG. 3A. The management information is needed for managing general information recorded on the general information recording area 26.

Thereafter, another general information is newly recorded as indicated by an arrow D in FIG. 3B. Namely, the recording starts from the end of the area which already records the general information in the general information recording area 26 toward an outer periphery without leaving unused areas.

When the general information recording area 26 on the first layer 23 becomes full, the general information is recorded as indicated by an arrow E in FIG. 3B, i.e., from the innermost periphery of a general information recording area 27 on the second layer 24 toward an outer periphery.

Also in this case, the management information needed for managing the newly recorded general information is recorded in the management information recording area 25 contiguously to the previously recorded management information.

There may be unused space in the general information recording area 26 on the first layer 23 or the general information recording area 27 on the second layer 24. When requested to rewrite the recorded general information in this case, the optical disk recording and/or reproducing apparatus is additively records new general information so as to fill the unused space. This is regarded as rewriting information from the viewpoint of the management information.

The general information recording area 26 on the first layer 23 or the general information recording area 27 on the second layer 24 may be both full. When requested to rewrite the recorded general information in this case, the optical disk recording and/or reproducing apparatus performs a process to rewrite the said general information to new general information.

Figure 4A:
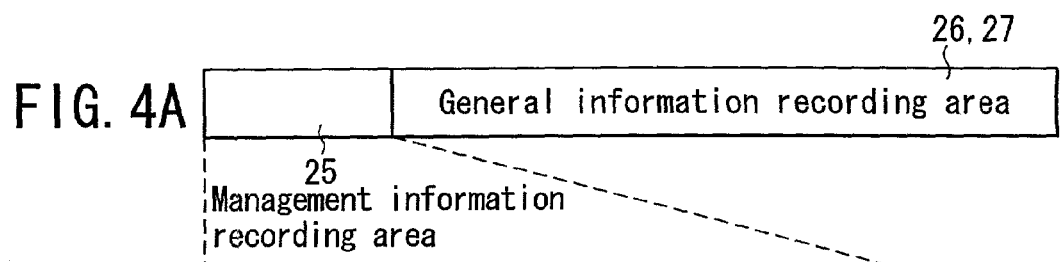
FIGS. 4A through 4C illustrate how recording management information is recorded in a management information recording area on a rewritable optical disk according to the embodiment.
Figure 4B:
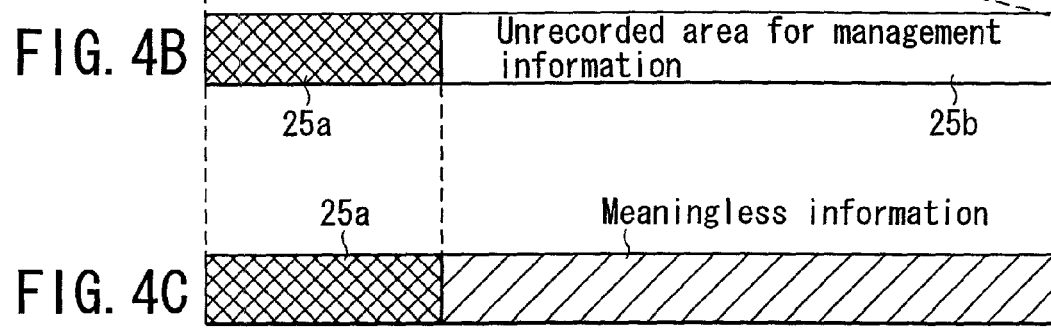
Figure 4C:
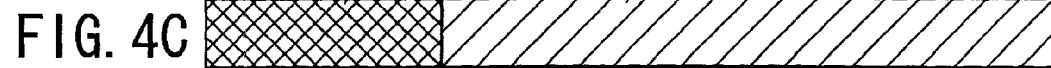

FIGS. 4A through 4C illustrate how the management information is recorded in the management information recording area 25 on the optical disk 11. As shown in FIG. 4A, there is no distinction between the first layer 23 and the second layer 24. The description here divides data recording areas on the optical disk 11 into the management information recording area 25 and the general information recording area 26 or 27.

The management information recording area 25 records the management information for managing general information recorded in the general information recording area 26 or 27. For example, the management information includes allocation management information (allocation table) about general files, AV file management information, etc.

The management information recording area 25 is recorded at a specified location on the optical disk 11, making it easy to rewrite the management information.

As shown in FIG. 4B, the management information recording area 25 normally comprises a recorded area 25a where management information is actually recorded and an unrecorded area 25b where no management information is recorded.

The management information recording area 25 formed on the first layer 23 may mixedly contain the recorded area 25a and the unrecorded area 25b. In this case, when the general information is recorded or reproduced from the second layer 24, an interlayer crosstalk occurs at a boundary between both areas 25a and 25b as mentioned above.

In the embodiment, as shown in FIG. 4C, meaningless information is written on all the unrecorded areas 25b for the management information without leaving unused areas in the management information recording area 25. This aims at eliminating the unrecorded area 25b from the management information recording area 25.

Consequently, the management information recording area 25 contains no boundary between the recorded area 25a and the unrecorded area 25b. A laser beam passes through the management information recording area 25 and is used to record or reproduce information from the second layer 24. In this case, it is possible to suppress an effect of interlayer crosstalk due to a difference between light reflectances of the recorded area 25a and the unrecorded area 25b.

A random bit string or a data pattern is selected as meaningless information. In order that the data pattern may be meaningless, the optical disk recording and/or reproducing apparatus reads it from the optical disk 11 and determines that it is meaningless and has no effects on normal operations.

The optical disk 11 may be a write-once read-many disk. This type of recording medium disables rewriting once information is written. When meaningless information is written overall on the unrecorded area 25b of the management information recording area 25 in such recording medium, the management information cannot be written later on.

Figure 5:
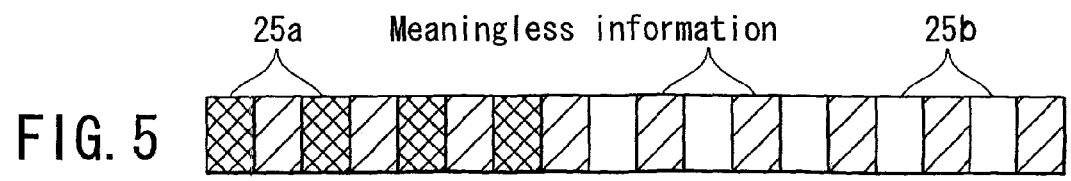
FIG. 5 illustrates a form of recording management information in a management information recording area on a write-once read-many optical disk according to the present invention.

When the optical disk 11 is a write-once read-many recording medium, the meaningless information is intermittently recorded at specified intervals in the management information recording area 25 to leave the unrecorded areas 25b as shown in FIG. 5. Namely, the unrecorded areas 25b are left dispersedly. The management information is sequentially written to these unrecorded areas 25b. The meaningless information is provided, e.g., every other track on the optical disk 11.

Figure 6A:
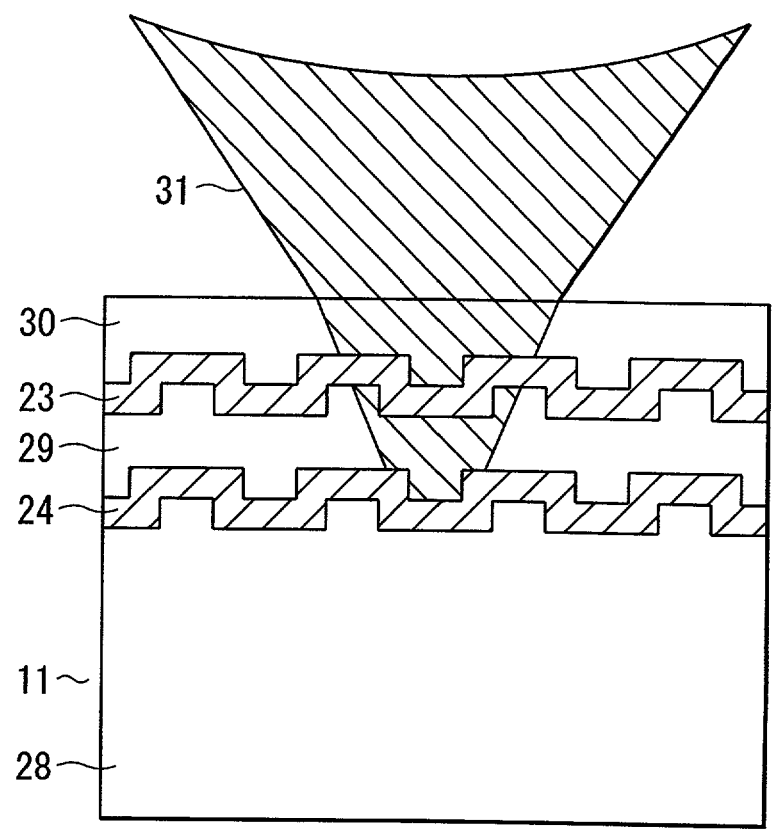
FIGS. 6A and 6B illustrate the structure of an optical disk according to the embodiment and the interlayer crosstalk.
Figure 6B:
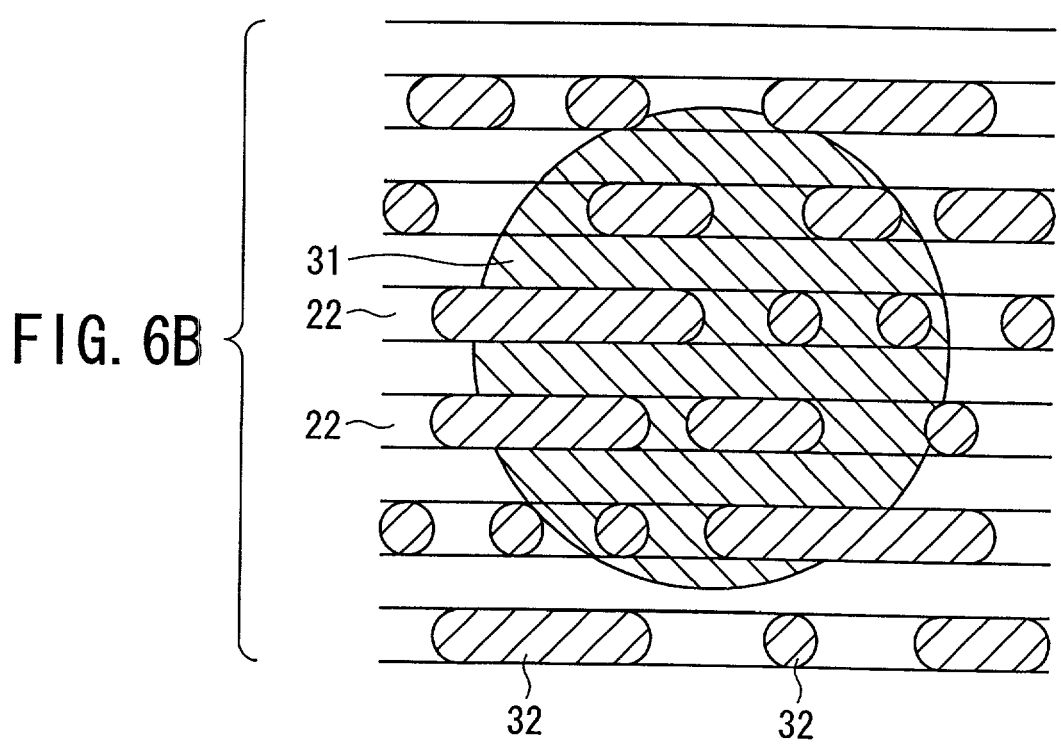

FIGS. 6A and 6B show the structure of the optical disk 11. With reference to FIGS. 6A and 6B, the following describes in more detail the cause of interlayer crosstalk occurrence and decreasing the interlayer crosstalk by writing meaningless information on the unrecorded area 25b of the management information recording area 25.

The optical disk 11 is configured as follows. The second layer 24 is formed on a substrate 28. The first layer 23 is formed on the second layer 24 via a transparent intermediate layer 29. A transparent protective film 30 is provided on the first layer 23.

Now, suppose that a laser beam 31 is converged on the second layer 24, detects changes in the amount of reflected light from the second layer 24, and reproduces information recorded on the second layer 24.

In this case, part of the laser beam 31 is reflected on the first layer 23 and leaks into the reflected light from the second layer 24. The first layer 23 and the second layer 24 cause a light reflectance difference between the recorded area and the unrecorded area (inside and outside of a recording mark 32).

The first layer 23 may be completely unrecorded and contain no recording mark 32. By contrast, the first layer 23 may overall record information and contain the recording marks 32 distributed everywhere. These extreme cases greatly change the amount of light which is reflected on the first layer 23 and leaks into the reflected light from the second layer 24.

In this manner, there occurs a change in the amount of light which is reflected on the first layer 23 and leaks into the reflected light from the second layer 24. This causes interlayer crosstalk for a signal reflected on the second layer 24 and used for information reproduction, degrading reproduction signal characteristics.

The aforementioned embodiment records meaningless information on the unrecorded area 25b in the management information recording area 25 on the optical disk 11, eliminating the unrecorded area 25b. Accordingly, it is possible to prevent occurrence of the aforementioned interlayer crosstalk.

As shown in FIG. 5, the recorded area 25a and the unrecorded area 25b are formed every other track on the optical disk 11. The recorded areas include areas for recording the management information and the meaningless information. In this case, the interlayer crosstalk decreases in comparison with the case of using all areas as the unrecorded areas 25b except recording areas for the management information. The reason is described below.

The interlayer crosstalk occurs due to the same reason as described above. Now, suppose that information is reproduced from the second layer 24. The laser beam 31 is not focused on the first layer 23 which is not to be reproduced. Accordingly, when the laser beam 31 forms a light flux on the first layer 23, the light flux is thick enough to cover a plurality of tracks.

Averaging the light reflected across a plurality of tracks results in the amount of light which is reflected on the first layer 23 and leaks into the reflected light from the second layer 24.

When the second layer 24 is reproduced, the recorded area 25a and the unrecorded area 25b may be mixed dispersedly within the track width equivalent to the laser beam's light flux on the first layer 23. In this case, it is possible to suppress changes in the amount of light which is reflected on the first layer 23 and leaks into the reflected light from the second layer 24 compared to the case where there is a boundary between the continuous recorded area 25a and the continuous unrecorded area 25b within the track width equivalent to the laser beam's light flux.

Figure 7:
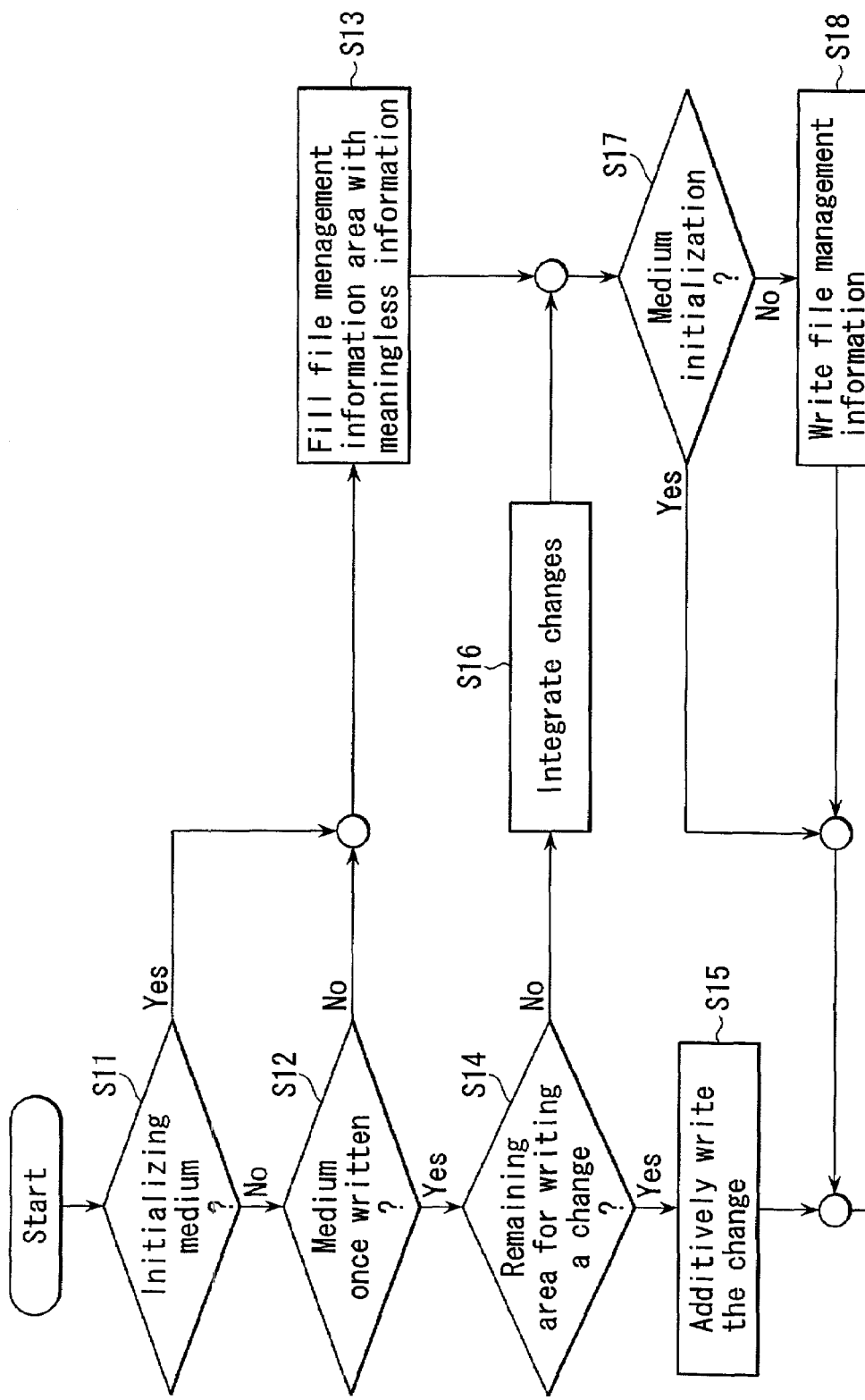
FIG. 7 is a flowchart which explains operations of recording information in the management information recording area on a rewritable optical disk according to the embodiment.

FIG. 7 is a flowchart which summarizes operations of recording information in the management information recording area 25 when the optical disk 11 is a rewritable recording medium.

A request may be made to record, change, or delete the general information from the general information recording area 26 or 27 on the optical disk 11 where the general information is not recorded yet. In this case, initial management information is written to the management information recording area 25. Thereafter, meaningless information is written to all the unrecorded areas 25b in the management information recording area 25. (See steps S11 through S13.)

A request may be made to record, change, or delete the general information from the optical disk 11 where the general information is already recorded. In this case, a change in the management information is written just after the management information which should be already recorded in the management information recording area 25. The change in the management information overwrites the meaningless information already recorded in the management information recording area 25.

The management information recording area 25 may not contain an area which records meaningless information and is large enough to write the change in the management information. In such a case, new management information is recreated by integrating the so far recorded changes and is recorded from the beginning of the management information recording area 25. Also in this case, meaningless information is written to the management information recording area 25 which is not used for recording new management information. (See steps S14 through S18.)

Figure 8:
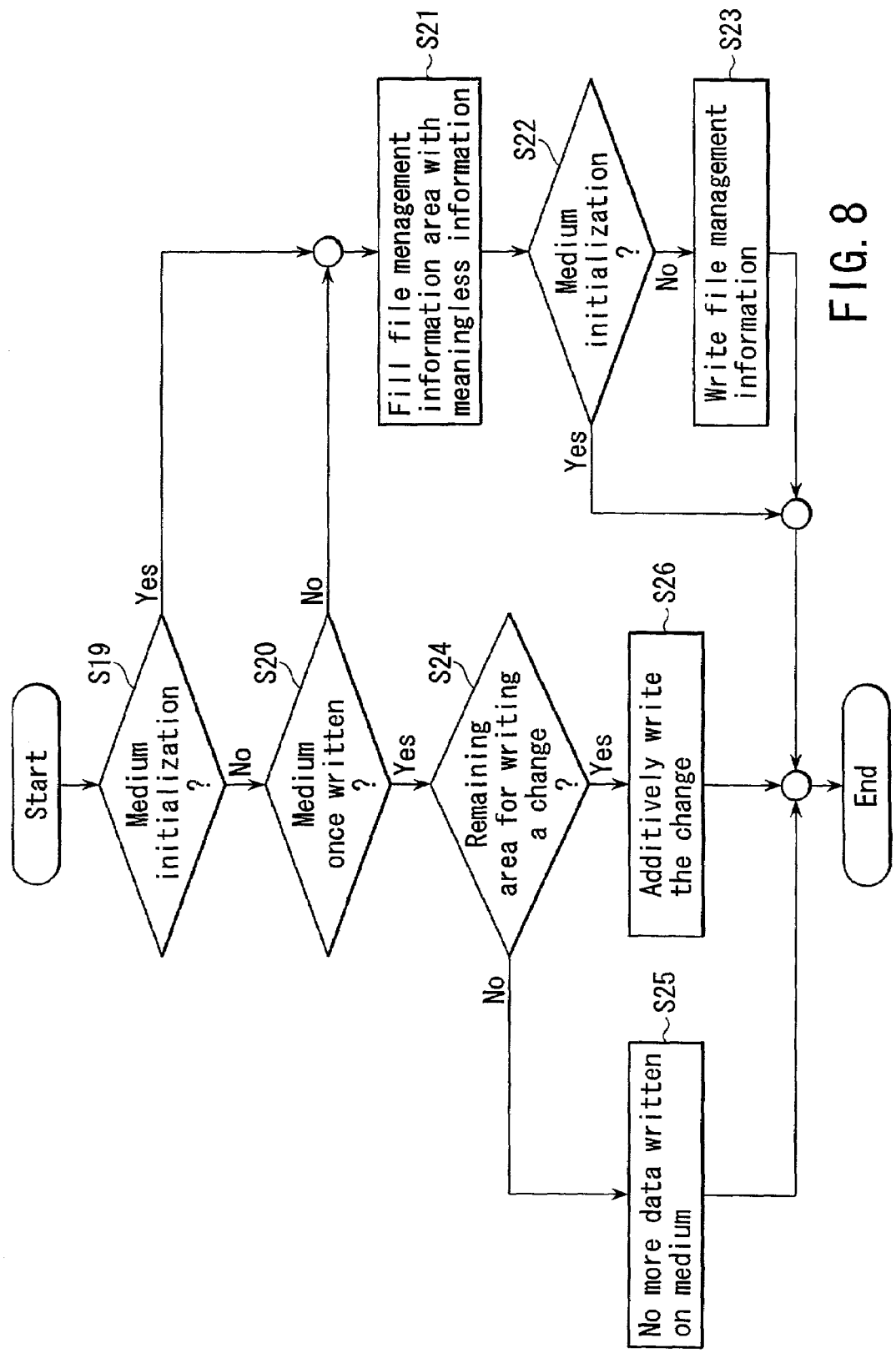
FIG. 8 is a flowchart which explains operations of recording information in the management information recording area on a write-once read-many optical disk according to the embodiment.

FIG. 8 is a flowchart which summarizes operations of recording information in the management information recording area 25 when the optical disk 11 is a write-once read-many recording medium.

A request may be made to record, change, or delete the general information from the general information recording area 26 or 27 on the optical disk 11 where the general information is not recorded yet. In this case, initial management information is written to the management information recording area 25. Thereafter, meaningless information is dispersedly written to the unrecorded areas 25b in the management information recording area 25 at specified intervals (e.g., every other track). (See steps S19 through S23.)

A request may be made to record, change, or delete the general information from the optical disk 11 where the general information is already recorded. In this case, a change in the management information is written to the unrecorded area 25b just after the management information which should be already recorded in the management information recording area 25. When the management information recording area 25 does not contain the unrecorded area 25b large enough to write the change in the management information, the general information cannot be recorded onto the general information recording area 26 or 27. (See steps S24 through S26.)

According to the above-mentioned embodiment, meaningless information is recorded in the unrecorded area 25b of the management information recording area 25 on the optical disk 11. This keeps the recorded area 25a and the unrecorded area 25b from mixing in the management information recording area 25. Consequently, it is possible to prevent the interlayer crosstalk from occurring.

In this case, meaningless information is written in the management information recording area 25 when the management information is recorded initially. The management information is additively recorded in the management information recording area 25 until it becomes full. This is convenient because meaningless information need not be written each time the management information is recorded.

The optical disk 11 maintains a fixed position for forming the management information recording area 25. Like the VAT for a CD-R (Compact Disk Recordable), for example, it is possible to fast obtain the management information without reading a recording medium to the end.

The management information recording area 25 is arranged on the first layer 23 nearer to the direction of irradiating a laser beam from the optical head 14. This causes no interlayer crosstalk when the management information is recorded or reproduced from the management information recording area 25. Accordingly, it is possible to improve reliability of the management information.

A change in the management information is additively recorded on the management information recording area 25 until it becomes full. This makes it possible to easily provide compatibility with the write-once read-many optical disk 11.

Even if the management information is not completely changed on the management information recording area 25 for some reason, the so far recorded management information remains. This decreases a possibility of entirely losing all the information in the management information recording area 25. This also reduces the chances of a problem that prevents information from being reproduced from the general information recording area 26 or 27 due to a loss of the management information.

A change in the management information is additively recorded in the management information recording area 25 until it becomes full. For this reason, if the specific general information is rewritten frequently, a specific location of the management information recording area 25 is not rewritten frequently. Accordingly, this can prevent the management information recording area 25 from soon reaching the limited number of write operations.

Jpn. Pat. Appln. KOKAI Publication No. 2001-101709 is a known example of the technology which aims at decreasing the interlayer crosstalk on a multilayer optical disk. In this KOKAI Publication, however, the interlayer crosstalk is decreased by improving the optical disk structure. There is no description about recording meaningless information in the unrecorded area 25b of the management information recording area 25 like the above-mentioned embodiment.

It is further understood by those skilled in the art that various changes and modifications may be made in the present invention without departing from the spirit and scope thereof.

What is claimed is:

1. An optical disk recording apparatus configured to record information on a rewritable optical disk having a general information recording area for recording general information and a management information recording area for recording management information which manages general information recorded on the general information recording area, said apparatus comprising:

a motor configured to rotatively drive the optical disk;

a processing section configured to perform predetermined processing with respect to information to be recorded on the optical disk, and convert the information to a format suited for recording on the optical disk; and an optical head configured to record the information which has been subjected to the predetermined processing by the processing section on the optical disk rotatively driven by the motor;

a meaningless information recording section configured to write meaningless information, which is determined to be meaningless at the time of reproduction of the optical disk, in all unrecorded areas without leaving unused areas, when an unrecorded area exists in the management information recording area of the optical disk; and a management information recording section configured to sequentially and additively record changes in said management information on said management information recording area by rewriting said meaningless information each time general information is recorded in said general information recording area of said optical disk.

2. The optical disk recording apparatus according to claim 1, wherein said management information recording section recreates new management information by integrating changes so far and re-records the new management information from the beginning of said management information recording area when said management information recording area does not contain an area enough to write a change in the management information.

3. An optical disk recording method of recording information on a rewritable optical disk having a general information recording area for recording general information and a management information recording area for recording management information which manages general information recorded on the general information recording area, said method comprising:

recording said management information on the management information recording area of said optical disk;

writing meaningless information, which is determined to be meaningless at the time of reproduction of the optical disk, in all unrecorded areas without leaving unused areas when an unrecorded area exists in the management information recording area after recording the management information; and sequentially and additively recording changes in said management information on said management information recording area by rewriting said meaningless information each time general information is recorded in the general information recording area of said optical disk.

4. The optical disk recording method according to claim 3, further comprising:

recreating new management information by integrating changes so far and re-recording it from the beginning of said management information recording area when said management information recording area does not contain an area enough to write a change in the management information.

5. An optical disk recording apparatus configured to record information on a write-once read-many (WORM) optical disk having a general information recording area for recording general information and a management information recording area for recording management information which manages general information recorded on the general information recording area, said apparatus comprising:

a motor configured to rotatively drive the optical disk;

a processing section configured to perform predetermined processing with respect to information to be recorded on the optical disk, and convert the information to a format suited for recording on the optical disk; and an optical head configured to record the information which has been subjected to the predetermined processing by the processing section on the optical disk rotatively driven by the motor;

a meaningless information recording section configured to write meaningless information, which is determined to be meaningless at the time of reproduction of the optical disk, in the unrecorded area intermittently at specified intervals, when an unrecorded area exists in the management information recording area of the optical disk; and a management information recording section configured to sequentially and additively record changes in said management information on unrecorded areas intermittently remaining in said management information recording area each time general information is recorded in said general information recording area of said optical disk.

6. An optical disk recording method of recording information on a WORM optical disk having a general information recording area for recording general information and a management information recording area for recording management information which manages general information recorded on the general information recording area, said method comprising:

recording the management information on the management information recording area of the optical disk;

intermittently writing, at specified intervals meaningless information, which is determined to be meaningless at the time of reproduction of the optical disk, when an unrecorded area exists in the management information recording area after recording the management information; and sequentially and additively recording changes in said management information on unrecorded areas intermittently remaining in said management information recording area each time general information is recorded in said general information recording area of said optical disk.

* * * * *